United States Patent
Watgen et al.

(10) Patent No.: US 10,252,695 B2
(45) Date of Patent: Apr. 9, 2019

(54) WIRELESS VEHICLE SEAT SENSOR UNIT ADAPTED FOR REMOVABLE VEHICLE SEATS

(71) Applicant: IEE International Electronics & Engineering S.A., Echternach (LU)

(72) Inventors: Claude Watgen, Sandweiler (LU); Holger Lorenz, Bernkastel-Kues (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 15/579,526

(22) PCT Filed: May 19, 2016

(86) PCT No.: PCT/EP2016/061289
§ 371 (c)(1),
(2) Date: Dec. 4, 2017

(87) PCT Pub. No.: WO2016/193014
PCT Pub. Date: Dec. 8, 2016

(65) Prior Publication Data
US 2018/0154863 A1 Jun. 7, 2018

(30) Foreign Application Priority Data
Jun. 5, 2015 (LU) .......................................... 92733

(51) Int. Cl.
*B60R 22/48* (2006.01)
*B60N 2/00* (2006.01)
*B60N 2/015* (2006.01)

(52) U.S. Cl.
CPC .............. *B60R 22/48* (2013.01); *B60N 2/002* (2013.01); *B60N 2/01508* (2013.01); *B60R 2022/4841* (2013.01); *B60R 2022/4858* (2013.01)

(58) Field of Classification Search
CPC .......... B60R 21/0152; B60R 21/01516; B60R 21/01536; B60R 21/01534;
(Continued)

(56) References Cited

U.S. PATENT DOCUMENTS 4,936,620 A * 6/1990 Francois ................ B64D 11/00
   105/345
5,211,423 A * 5/1993 Krambeck .......... B60R 22/1953
   280/806
(Continued)

FOREIGN PATENT DOCUMENTS

DE        4237072 C1    12/1993
DE     102007029650 A1    1/2009
WO     WO2007007009 A2    1/2007

OTHER PUBLICATIONS

Anonymous, "Wireless method of informing driver of rear seatbelt usage", Research Disclosure, Kenneth Mason Publications, Hampshire, UK, GB, vol. 401, No. 61, Sep. 1, 1997—ISSN 0374-4353, 1 page.
(Continued)

*Primary Examiner* — Daniel Previl
(74) *Attorney, Agent, or Firm* — Reising Ethington P.C.

(57) ABSTRACT

A vehicle seat sensor unit includes a seat occupancy sensor configured for wirelessly communicating with a control unit, at least one first seat detection sensor member and at least one second seat detection sensor member. The first seat detection sensor member is arrangeable in one out of a lower vehicle seat portion of a vehicle seat that is mountable in a vehicle in a removable manner, and a vehicle cabin floor,
(Continued)

and the second seat detection sensor member is attachable to the other one of the lower vehicle seat portion and the vehicle cabin floor. The first seat detection sensor member and the second seat detection sensor member are configured to physically interact if mutually arranged within a specific distance. The physical interaction results in a detectable change of a status of at least one out of the first seat detection sensor member and the second seat detection sensor member.

14 Claims, 3 Drawing Sheets

(58) Field of Classification Search
CPC .......... B60R 21/01538; B60R 21/0136; B60R 2001/1223; B60R 2001/1253; B60R 21/01552; B60R 21/013; B60R 21/0153; B60R 21/01542; B60R 16/037
USPC .......... 340/457.1, 425.5, 438, 665, 441–443, 340/446, 459, 552, 436, 573.1, 903, 435, 340/901
See application file for complete search history.

(56) References Cited

U.S. PATENT DOCUMENTS

| | | | | |
|---|---|---|---|---|
| 5,788,329 A * | 8/1998 | Pilarczyk | ................. | B60P 3/38 |
| | | | | 297/354.13 |
| 5,871,063 A | 2/1999 | Young | | |
| 5,890,762 A * | 4/1999 | Yoshida | ............... | B60N 2/2821 |
| | | | | 297/130 |
| 6,037,860 A * | 3/2000 | Zander | ................. | B60W 30/09 |
| | | | | 307/10.1 |
| 6,056,078 A * | 5/2000 | Pham | ................... | B62D 31/003 |
| | | | | 180/209 |
| 7,536,920 B2 * | 5/2009 | Decoster | ................ | B60N 2/002 |
| | | | | 340/573.1 |
| 7,639,125 B2 * | 12/2009 | Federspiel | ............ | B60N 2/002 |
| | | | | 180/271 |
| 2011/0127246 A1 * | 6/2011 | Heiden | .................... | B60L 1/02 |
| | | | | 219/202 |

OTHER PUBLICATIONS

International Search Report for International application No. PCT/EP2016/061289, dated Aug. 24, 2016, 3 pages.
Written Opinion for International application No. PCT/EP2016/061289, dated Aug. 24, 2016, 6 pages.

* cited by examiner

WIRELESS VEHICLE SEAT SENSOR UNIT ADAPTED FOR REMOVABLE VEHICLE SEATS

TECHNICAL FIELD

The invention relates to a vehicle seat sensor unit, a vehicle seat sensor system including such vehicle seat sensor units, and a method for providing seat belt reminder function for vehicle seats that are mountable in a vehicle in a removable manner.

BACKGROUND OF THE INVENTION

Today's automotive safety standards require automotive vehicles to be equipped with seat belt reminder (SBR) systems for reminding a vehicle passenger to fasten the seat belt associated to the occupied vehicle seat. While until now, those seat belt reminder systems were mainly associated with front seats of the vehicle, future standards will require also rear seat to be equipped with such seat belt reminder systems.

Seat belt reminder systems typically comprise a seat occupancy sensor associated with a vehicle seat for detecting a presence of an occupant on the respective seat and for generating a signal indicative of such presence, and a seat belt fastening detector for determining a seat belt usage condition and for generating a signal indicative thereof. A control unit then uses the signals of the seat occupancy sensor and the seat belt fastening detector in order to determine whether the actual seat occupancy would require a non-fastened seat belt to be fastened and, if this is the case, to issue a corresponding warning signal.

The seat occupancy sensors usually comprise pressure-sensing devices integrated in the respective passenger seat for detecting a pressure induced by the presence of a passenger into the seat. The pressure-sensing devices, as e.g. disclosed in DE 42 37 072 C1, comprise a plurality of individual force sensors, which are connected in a suitable manner to a control unit designed for measuring a pressure-depending electrical property of said individual pressure sensors. These occupancy sensors have proven to be very reliable and well adapted to the detection of seat occupancy.

The seat belt fastening detectors typically comprise mechanical or magnetic buckle switches for detecting whether a latch of the seat belt is inserted into the seat belt buckle. One such buckle switch is e.g. disclosed in U.S. Pat. No. 5,871,063 A. As an alternative to the buckle switches, seat belt fastening detectors have been proposed which generate a buckled/unbuckled signal based on the tension in the seat belt.

One drawback of the known seat belt reminder systems lies in the fact that the seat occupancy sensor and the seat belt fastening detector usually have to be physically connected to the control unit by means of connection wires in order to be functional. This need for physically connecting the sensing device to the control unit however causes problems especially in modern cars equipped with a flexible seating system with removable and/or displaceable back seats.

In order to overcome this drawback, seat occupancy sensor systems have been proposed in which a signal representing the occupancy status is wirelessly transmitted from the seat to a control unit which is mounted in the vehicle. Such systems have e.g. been disclosed in documents U.S. Pat. No. 7,536,920 B2 or U.S. Pat. No. 7,639,125 B2. These systems solve the problem of the physical connection of the seat occupancy sensor or the seat belt fastening detector to the control unit. However, these systems suffer from the problem that the control unit, which receives a signal from a wireless seat sensor system, does not necessarily know in which location this seat is mounted in the vehicle, or whether it is correctly mounted at all. The system could, for instance, receive a signal from a seat stored in the trunk of the vehicle. Likewise, the absence of a signal from the seat sensor may be caused by a failure of the seat sensor system, or simply by the seat not being mounted in the vehicle.

SUMMARY

It is therefore an object of the invention to provide a seat occupancy sensor system which solves at least one of the above problems.

In one aspect of the present invention, this object is achieved by a vehicle seat sensor unit that comprises at least one seat occupancy sensor that is arrangeable at a surface of a vehicle seat, wherein the seat occupancy sensor is configured for wirelessly communicating with a control unit to be mounted in a vehicle. It should be noted that the expression "arrangeable at a surface of a vehicle seat", as used in this application, shall in particular be understood as meaning that the seat occupancy sensor may be arranged at any suitable surface of the vehicle seat, such as the A-surface of the seat cushion or at the B-surface of the seat cushion or the backrest.

The vehicle seat sensor unit further includes at least one first seat detection sensor member and at least one second seat detection sensor member. The at least one first seat detection sensor member is arrangeable in one out of a lower vehicle seat portion and a vehicle cabin floor, and the at least one second seat detection sensor member is fixedly attachable to the other one out of the lower vehicle seat portion and the vehicle cabin floor to which the vehicle seat is fixedly mountable in a removable manner The at least one first seat detection sensor member and the at least one second seat detection sensor member are configured to physically interact if mutually arranged within a specific distance. The physical interaction results in a detectable change of a status of at least one out of the at least one first seat detection sensor member and the at least one second seat detection sensor member.

The phrase "being configured to", as used in this application, shall in particular be understood as being specifically programmed, laid out, furnished or arranged.

The term "vehicle", as used in this application, shall particularly be understood to encompass passenger cars, trucks and buses.

It is further noted herewith that the terms "first", "second", etc. are used in this application for distinction purposes only, and are not meant to indicate or anticipate a sequence or a priority in any way.

The phrase "specific distance", as used in this application, shall particularly be understood as a distance that is specific to the sensor members and the nature of their physical interaction.

The vehicle seat sensor unit can advantageously provide information on a seat occupancy and, further, information indicating a presence of a removable seat in the vehicle, even in case that the removable seat is not correctly mounted the vehicle. In a suitable embodiment, a detected absence of the physical interaction may indicate that the removable seat is not integrated in the vehicle and may, for instance, be stored nearby the vehicle or in a trunk of the vehicle.

Particularly, in this way false seat belt reminder warnings can be avoided if a piece of luggage is put on the seat occupancy sensor of a removable vehicle seat that is kept in the vehicle trunk.

Preferably, the vehicle seat sensor unit comprises a number of at least n first seat detection sensor members, with n being a natural number larger than one, wherein the at least n first seat detection sensor members are arrangeable in one out of the lower vehicle seat portion and the vehicle cabin floor at mutually different mounting locations. Moreover, the vehicle seat sensor unit includes a number of m second seat detection sensor members, with m being a natural number larger than one and equal to or smaller than n.

The m second seat detection sensor members are attachable to the other one out of the lower vehicle seat portion and the vehicle cabin floor at mutually different mounting locations, such that at least two of the m second seat detection sensor members are arrangeable within a specific distance to two different first seat detection sensor members of the at least n first seat detection sensor members. By that, it can beneficially be detected if the removable vehicle seat is correctly mounted the vehicle.

In a preferred embodiment, the m second seat detection sensor members are attachable to the other one out of the lower vehicle seat portion and the vehicle cabin floor at mutually different mounting locations, such that each one of the m second seat detection sensor members is arrangeable within the specific distance to a different one of the first seat detection sensor members of the at least n first seat detection sensor members. In this way, an improved reliability with regard to assessing a correct mounting of the removable vehicle seat of the vehicle can be accomplished.

The even larger advantage of such a vehicle seat sensor system can readily be understood as follows. Defining a physical interaction of a first seat detection sensor member and a second seat detection sensor member within the specific distance as a logical value of TRUE or "1", and defining an absence of a physical interaction of a first seat detection sensor member and a second seat detection sensor member as a logical value of FALSE or "0", and choosing n=3 as a non-limiting example, the following status patterns can be detected for a correctly mounted removable vehicle seat:

(101), (110), (111)

Herein, the first logical value indicates the presence or absence of the seat. The second logical value and the third logical value indicate if the other two first seat detection sensor members physically interact with a second seat detection sensor member or not. Where there is a logical value of "0" in the status patterns of a correctly mounted vehicle seat above, a second seat detection sensor member is obviously not required. Thus, for n=3 first seat detection sensor members, three mutually different status patterns can be detected for a correctly mounted removable vehicle seat, or, in other words, mutually different status patterns of three correctly mounted removable vehicle seats are distinguishable by installing first and second seat detection sensor members to the three removable vehicle seats according to the status patterns above. By that, the removable vehicle seats can be digitally coded by employing the disclosed embodiment of the vehicle seat sensor unit. The number m of second seat detection sensor members to be used in each one of the three removable vehicle seats is obtainable from the number of "1"s in the status patterns shown above.

In general, it can easily be obtained from the analogy of the status patterns to binary numbers that by employing a number of n first seat detection sensor members, with n being a natural number larger than one, $2^{(n-1)}-1$ mutually different status patterns can be generated, wherein the term of n−1 results from allocating one of the first seat detection sensor members to indicating the presence of the removable vehicle seat.

Furthermore, the three status patterns shown above are the status patterns that confirm a correct mounting of one of the three removable vehicle seats. Any differing detected status pattern is an indication of a removable vehicle seat being not correctly mounted.

In an information-related approach, the status pattern shown above can be understood as data sets comprising three bits of information. The first bit is used to indicate whether the removable vehicle seat is present or not. The second and third bit can take three mutually different, non-zero values: 01, 10, and 11. Thus, three bits of information facilitate $2^{(n-1)}-1=3$ different mounting possibilities.

# of Bits Information on
1→bit seat presence
2→bits seat presence+seat not correctly mounted
3→bits seat presence+3 mounting possibilities+seat not correctly mounted
4→bits seat presence+7 mounting possibilities+seat not correctly mounted
5→bits seat presence+15 mounting possibilities+seat not correctly mounted Preferably, the physical interaction is of at least one out of magnetic, electromagnetic and optical nature. A variety of such first and second seat detection sensor members are well known to those skilled in the art. Examples of first and second seat detection sensor members include but are not limited to optical fibers and photodetectors, short-range radio frequency identification (RFID) tags and corresponding RFID readers, and magnets and magnetic fields-sensitive switches.

In some preferred embodiments, the at least one first seat detection sensor member or at least one of the n first seat detection sensor members comprises at least one reed switch. The at least one of the second seat detection sensor member or at least one of the second seat detection sensor members is configured to generate a magnetic field at least within a distance equal to the specific distance.

The at least one reed switch has a first switching status in the absence of a magnetic field. If the second seat detection sensor member generates a magnetic field within the specific distance, the at least one reed switch is transferred to a second switching status. Changes between the first switching status and the second switching status of the at least one reed switch can readily be detected.

The second seat detection sensor member may be designed as an electromagnet or may be formed by a permanent magnet. In this way, reliable and cost-effective first and second seat detection sensor members can be provided.

Reed switches provide the advantage of being small, robust and cost-efficient. The combination of a reed switch and an electromagnet or a permanent magnet further has the benefit of large mounting tolerances, facilitating an easy installation. The small size of a reed switch and an electromagnet or a permanent magnet enables removing or mounting the removable vehicle seat without any further installation effort regarding the first and second seat detection sensor member.

Preferably, the vehicle seat sensor unit further includes a decoder unit for detecting and evaluating the detectable changes of statuses of the first seat detection sensor members and the second seat detection sensor members. Due to the aforementioned analogy to binary numbers, the decoder unit may be a logic decoder unit processing status patterns as binary numbers, which reduces a hardware effort. The decoder unit may be configured for wirelessly communicating with the control unit.

In some preferred embodiments, the vehicle seat sensor unit further includes a seat belt fastening detector for detecting a seat belt usage condition and for generating a signal indicative thereof, the seat belt fastening detector being configured for providing the signal to the control unit. By employing the signals from the vehicle seat sensor unit, false seat belt reminder warnings can be avoided if, for instance a piece of luggage is put on the seat occupancy sensor of a removable vehicle seat that is kept in the vehicle trunk.

From the above those skilled in the art will readily appreciate that due to a symmetry between the first and second seat detection sensor members, either the first or the second seat detection sensor member is or either the first or the second seat detection sensor members are arrangeable in the vehicle seat, and the other one out of the first and second seat detection sensor member is or the other one out of the first and second seat detection sensor members are fixedly attachable at the vehicle cabin floor. The choice of which type of seat detection sensor member to arrange in the vehicle seat and which type of seat detection sensor member to attach at the vehicle cabin floor may be taken from constraints stemming from an operating principle that the seat detection sensor members are based on.

In another aspect of the invention, a vehicle seat sensor system is provided that comprises a number of k vehicle seat sensor units as disclosed herein, wherein k is a natural number and is equal to or smaller than $2^{(n-1)}-1$ and n is a natural number larger than one. The seat occupancy sensor, if applicable the seat belt fastening detector, and either the at least n first seat detection sensor members or the m second seat detection sensor members of each one of the k vehicle seat sensor units are arrangeable at a different vehicle seat of a vehicle. In this way, the removable vehicle seats of a vehicle can be digitally coded as described before, and the advantages of the vehicle seat sensor units are fully usable.

In yet another aspect of the invention, a seat belt reminder system is provided that includes an embodiment of the aforementioned vehicle seat sensor system, and further comprises a control unit configured for wireless communication with the seat occupancy sensors, the seat belt fastening detectors and the decoder units By that, a vehicle user can be informed
if a specific removable seat is mounted in the vehicle,
if a removable seat is correctly mounted in the vehicle, and
where in the vehicle a removable seat is mounted.

In yet another aspect of the invention, a vehicle seat is provided that is mountable in a vehicle in a removable manner. The vehicle seat includes embodiment of the disclosed vehicle seat sensor unit. Further, the seat occupancy sensor is arranged at a surface of the vehicle seat, and either the first or the second seat detection sensor member is or either the first or the second seat detection sensor members are arranged in the vehicle seat. The decoder unit is arranged in the vehicle seat, and the seat belt fastening detector is installed in the vehicle seat.

In yet another aspect of the present invention, the object is achieved by a method for providing seat belt reminder function for vehicle seats that are mountable in a vehicle in a removable manner, using an embodiment of the seat belt reminder system, which includes a decoder unit and a seat belt fastening detector.

The method comprises steps of
for each vehicle seat, detecting the status of each one of the first seat detection sensor members or the second seat detection sensor members, whichever shows the detectable status change,
for each vehicle seat, comparing the detected status with a set of predetermined codes, and
in case of the detected status matching a specific code of the set of predetermined codes, communicating at least the specific code to the control unit.

By applying this method, a vehicle user can be informed if a specific removable seat is mounted in the vehicle, if a removable seat is correctly mounted in the vehicle, and where in the vehicle a removable seat is mounted.

In another preferred embodiment, the method further comprises steps of
repetitively detecting, for each vehicle seat, the status of each one of the first seat detection sensor members or the second seat detection sensor members,
recording the detected statuses,
checking if at least one detected sensor member status has changed in comparison to a preceding recorded status of the sensor member,
conducting at least the last two steps of the above-described method, if at least one changed sensor member status has been detected.

In this way, when one of the removable vehicle seats is installed or removed, the changed status of the seat detection sensor members will initiate the step of conducting at least the last two steps of the above-described method. Specific codes will be communicated to the control unit. In this way, the information if and where removable vehicle seats are installed is available at least at the control unit. As a further option, this information can be communicated to or retrieved by another vehicle control unit.

In a further embodiment, the method further comprises steps of
for each vehicle seat, retrieving a contents of a communication with the seat occupancy sensor of a specific vehicle seat and a signal provided by the seat belt fastening detector of the specific vehicle seat,
for each vehicle seat, generating a seat belt fastening warning signal based on a combination of
the contents of the communication with the seat occupancy sensor of the specific vehicle seat,
the signal provided by the seat belt fastening detector of the specific vehicle seat, and
the communicated code representing a status of the seat detection sensor members arranged at the specific vehicle seat
matching at least one predetermined condition.

In this way, false positive warnings can be prevented that may occur, for instance in a situation in which a removable vehicle seat has been removed and is being stored in a trunk of the vehicle, and a luggage piece that is heavy enough to trigger the seat occupancy sensor is put on the vehicle seat.

BRIEF DESCRIPTION OF THE DRAWINGS

Further details and advantages of the present invention will be apparent from the following detailed description of not limiting embodiments with reference to the attached drawing, wherein.

DESCRIPTION OF PREFERRED EMBODIMENTS

Figure 1:
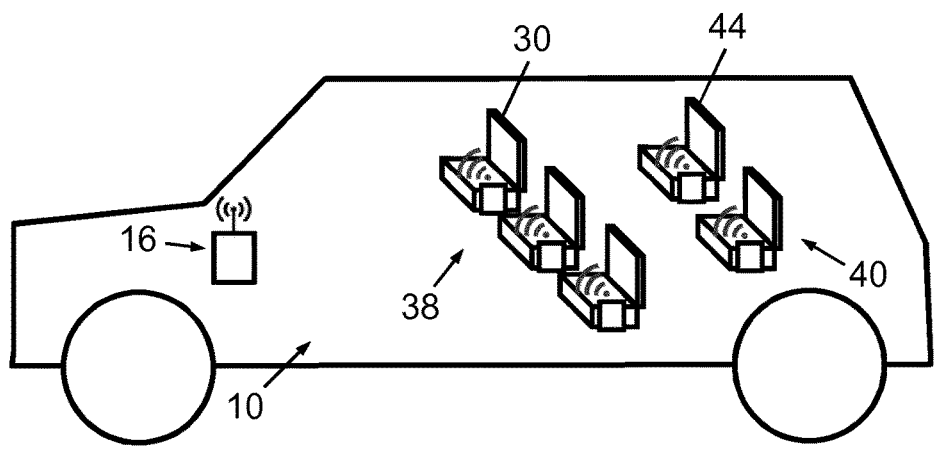
FIG. 1 is a schematic illustration of a side view on a vehicle with five vehicle seats mounted in a removable manner and a seat belt reminder system in accordance with an embodiment of the invention.

FIG. 1 schematically illustrates a vehicle formed by a passenger car with five vehicle seats 30, 44, three of which are fixedly mounted to a vehicle cabin floor 42 (FIG. 2) in a removable manner, and a seat belt reminder system 10 in accordance with an embodiment of the invention, in a side view. The five vehicle seats 30, 44 in FIG. 1 are arranged in two rows: three juxtaposed removable vehicle seats 30 being arranged as a middle row 38, and a back row 40 comprising two juxtaposed, fixedly mounted vehicle seats 44. The front seats are omitted in FIG. 1 for clarity reasons. Although the front seats and the back row vehicle seats 44 are equipped with components that form part of the seat belt reminder system 10, such as a seat occupancy sensor and a seat belt fastening detector, they will be left out of this description as they are not designed as removable vehicle seats.

Figure 2:
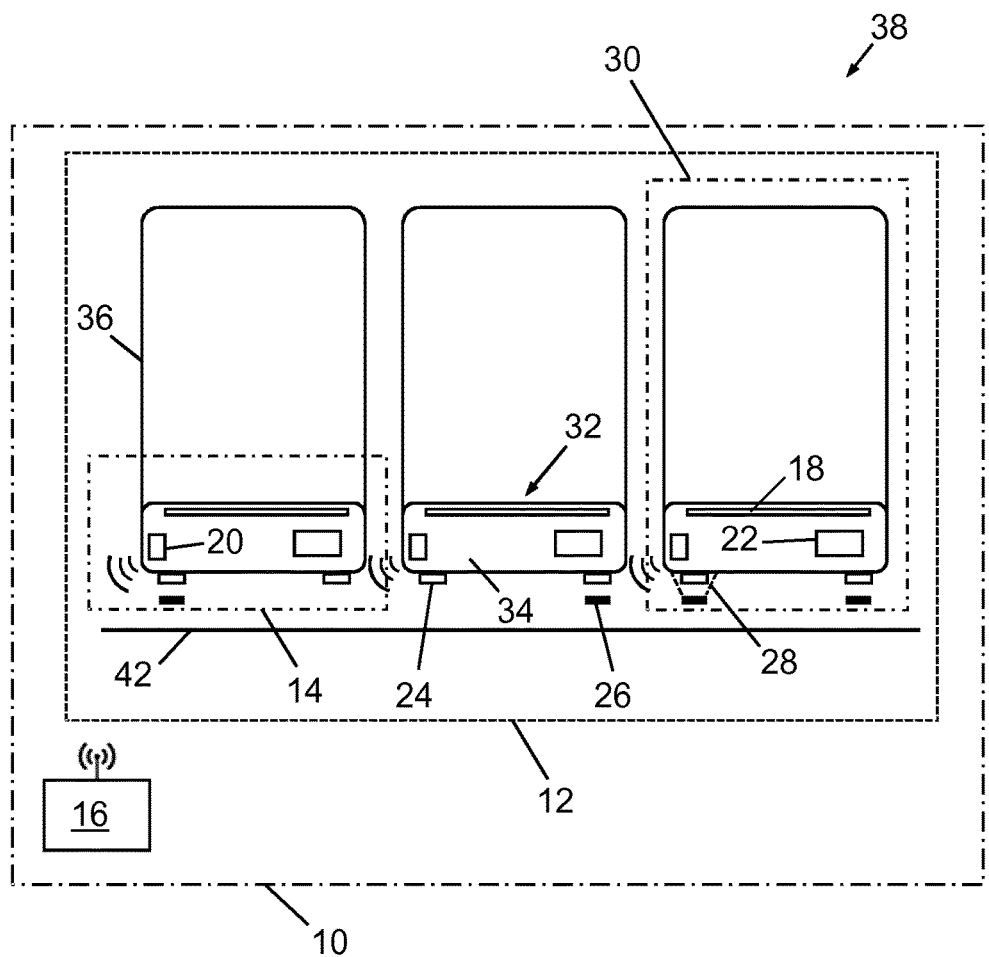
FIG. 2 schematically shows one of the vehicle seat rows of the vehicle pursuant to FIG. 1 and details of the seat belt reminder system.

Referring now to FIG. 2, each removable vehicle seat 30 is erected on the vehicle cabin floor 42 of the vehicle by a seat structure (not shown), which is designed to enable to remove or mount the vehicle seat 30 by hand, without or with only minor use of tools. Each vehicle seat 30 includes a seat cushion 34 for providing comfort to a seat occupant. The seat cushion 34 is designed for supporting the bottom of the seat occupant. A backrest 36 of each vehicle seat 30 is provided for supporting a back of the seat occupant.

The seat belt reminder system 10 includes a vehicle seat sensor system 12 and a control unit 16, comprising a processor unit and a digital data memory unit, which is arranged in the vehicle but remote from the vehicle seats 30, 44. The control unit 16 is configured for wireless communication with other components of the vehicle seat sensor system 12, as will be described in the following.

FIG. 2 schematically shows the middle row 38 comprising the three juxtaposed removable vehicle seats 30 of the vehicle pursuant to FIG. 1 and details of the seat belt reminder system 10. The three removable vehicle seats 30 are shown as correctly mounted in the vehicle.

The vehicle seat sensor system 12 comprises three vehicle seat sensor units 14, wherein each one of the three vehicle seats 30 is furnished with one of the three vehicle seat sensor units 14.

Except for a left-right asymmetry and variations in the number of components that will be discussed in the following, the vehicle seat sensor units 14 are identically designed. Thus, for better understandability, one vehicle seat sensor unit 14 will be described in a representative manner, and variations among the vehicle seat sensor units 14 will be presented in detail.

The vehicle seat sensor unit 14 includes a seat occupancy sensor 18 that is arranged at the seat cushion 34, e.g. at an A-surface of the seat cushion (i.e. the upper surface of the cushion) or at the B-surface (i.e. the lower surface of the seat cushion) or at the backrest of the seat. The seat occupancy sensor 18 is connected to a common wireless communication means (not shown) of the vehicle seat sensor unit 14 and is configured for wirelessly communicating with the control unit 16 via the common wireless communication means. The vehicle seat sensor unit 14 further comprises a seat belt fastening detector 20 that is configured for detecting a usage condition of a seat belt that forms part of the vehicle seat 30, and for generating a signal indicative thereof. The seat belt fastening detector 20 is connected to the common wireless communication means for wirelessly providing the signal to the control unit 16.

Figure 3:
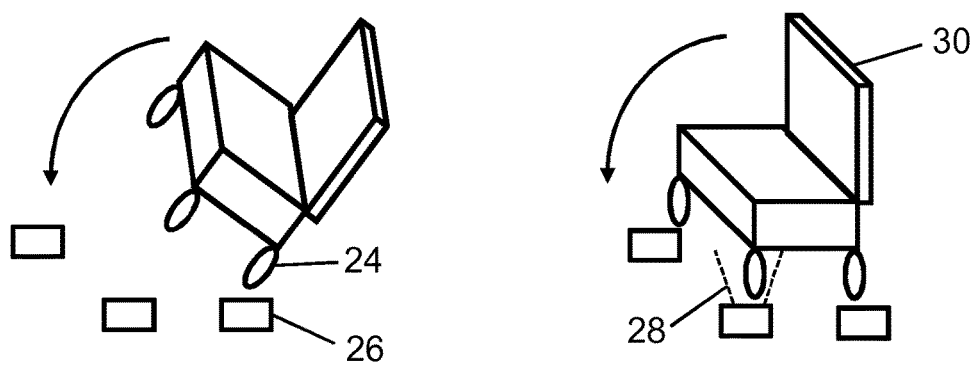
FIG. 3 schematically illustrates one of the vehicle seats of the vehicle seat row pursuant to FIG. 2 in two different mounting conditions.

Further, the vehicle seat sensor unit 14 comprises a number of n=3 first seat detection sensor members 24 and a number of m second seat detection sensor members 26. Two of the three first seat detection sensor members 24 are visible in FIG. 2. The third first seat detection sensor member 24 of the vehicle seat is e.g. arranged at a left back corner of the vehicle seat 30, as shown in FIG. 3, for all three removable vehicle seats 30. The first seat detection sensor members 24 are arranged in a lower vehicle seat portion 32. The second seat detection sensor members 26 are fixedly arranged at the vehicle cabin floor 42. The number m of second seat detection sensor members 26 is larger than one and equal to or smaller than n and varies in this specific embodiment among the vehicle seats 30 between two and three.

Each of the first seat detection sensor members 24 comprises for instance a reed switch. Each of the second seat detection sensor members 26 is then preferably formed as a permanent magnet designed to generate a magnetic field having at least a specified field strength in a specific distance 28. If mutually arranged within the specific distance 28, the first 24 and the second seat detection sensor members 26 physically interact. As the specified magnetic field strength is sufficiently large within the specific distance 28, the physical interaction results in a detectable change of a switching status of the first seat detection sensor member 24. By suitably selecting the magnetic field strength, the arrangement can be made robust with regard to mounting tolerances, facilitating an easy installation.

The number n of first seat detection sensor members 24 are arranged at mutually different mounting locations in the lower vehicle seat portion 32: left rear corner, left front corner and right front corner. The m second seat detection sensor members 26 are fixedly arranged at the vehicle cabin floor 42 at mutually different mounting locations such that each one of the m second seat detection sensor members 26 is arranged within the specific distance 28 to a different one of the n first seat detection sensor members 24 if the vehicle seat 30 is correctly mounted in the vehicle. For all three correctly mounted removable vehicle seats 30, one of the m second seat detection sensor members 26 is fixedly mounted to the vehicle cabin floor 42 at a location that lies within the specific distance 28 to the first seat detection sensor member 24 arranged at the left rear corner of the vehicle seat 30.

For the vehicle seat 30 shown on the left hand side of FIG. 2, besides the second seat detection sensor member 26 arranged within the specific distance 28 to the first seat detection sensor member 24 arranged at the left back corner, another second seat detection sensor member 26 is arranged within the specific distance 28 of the first seat detection sensor member 24 arranged at the right front corner.

For the vehicle seat 30 shown in the middle of FIG. 2, besides the second seat detection sensor member 26 arranged within the specific distance 28 to the first seat detection sensor member 24 arranged at the left back corner, another second seat detection sensor member 26 is arranged within the specific distance 28 to the first seat detection sensor member 24 arranged at the left front corner.

For the vehicle seat 30 shown on the right hand side of FIG. 2, besides the second seat detection sensor member 26 arranged within the specific distance 28 to the first seat detection sensor member 24 arranged at the left back corner, second seat detection sensor members 26 are arranged within the specific distance 28 to the first seat detection sensor members 26 arranged at the left front corner and the right front corner, respectively.

The vehicle seat sensor unit 14 further includes a decoder unit 22 for detecting and evaluating the detectable changes of statuses of the first seat detection members 24 of the vehicle seat 30. To this end, the decoder unit 22 is electrically connected to the reed switches of the vehicle seat 30. In particular, the decoder unit 22 is designed as a logic decoder unit, wherein a switching status of a reed switch arranged within the specific distance 28 to a permanent magnet is assigned the logical value "1", and a switching status of a reed switch arranged outside the specific distance 28 to a permanent magnet is assigned the logical value "0".

From the left vehicle seat 30 to the right vehicle seat 30 shown in FIG. 2, the decoder units 22 can detect the following status patterns, consisting of the logical values of the switching statuses of the reed switches if the vehicle seat 30 is correctly mounted in the vehicle:

(101), (110), (111)

It is worth noting that the status patterns for a correctly mounted vehicle seat 30 stays with the position within the middle row 38 of vehicle seats 30. So, irrespective of which one of the three removable vehicle seats 30 is correctly mounted at a specific position within the middle row 38, the detectable status pattern remains the same, and a status pattern detected by the decoder unit 22 of the vehicle seat 30 is indicative of the specific position of the correctly mounted vehicle seat 30.

The decoder unit 22 is connected to the common wireless communication means of the vehicle seat sensor unit 14 and is configured for wirelessly transmitting a detected status pattern to the control unit 16 via the common wireless communication means.

FIG. 3 schematically illustrates one of the vehicle seats 30 of the middle seat row 38 pursuant to FIG. 2 in two different mounting conditions. In this specific embodiment, the mounting of the vehicle seat 30 is carried out by firstly aligning a rear lower edge to a guiding bracket of the seat structure (not shown), and by subsequently pivoting the vehicle seat 30 about an axis that runs in parallel with the rear lower edge.

In the left-hand side part of FIG. 3, the vehicle seat 30 is aligned for mounting, but is not pivoted correctly in its end position for being correctly mounted as shown in the right-hand side part of FIG. 3. The first seat detection sensor member 24 arranged at the left rear corner is arranged within the specific distance 28 to the second seat detection sensor member 26 that is fixedly mounted to the vehicle cabin floor 42. The first seat detection sensor member 24 arranged at the left front corner and the first seat detection sensor member 24 arranged at the right front corner of the vehicle seat 30 are arranged outside the specific distance 28 to the second seat detection sensor members 26.

Thus, instead of detecting status pattern (111) for the correctly mounted vehicle seat 30, the decoder unit 22 will detect status pattern (100).

Figure 4:
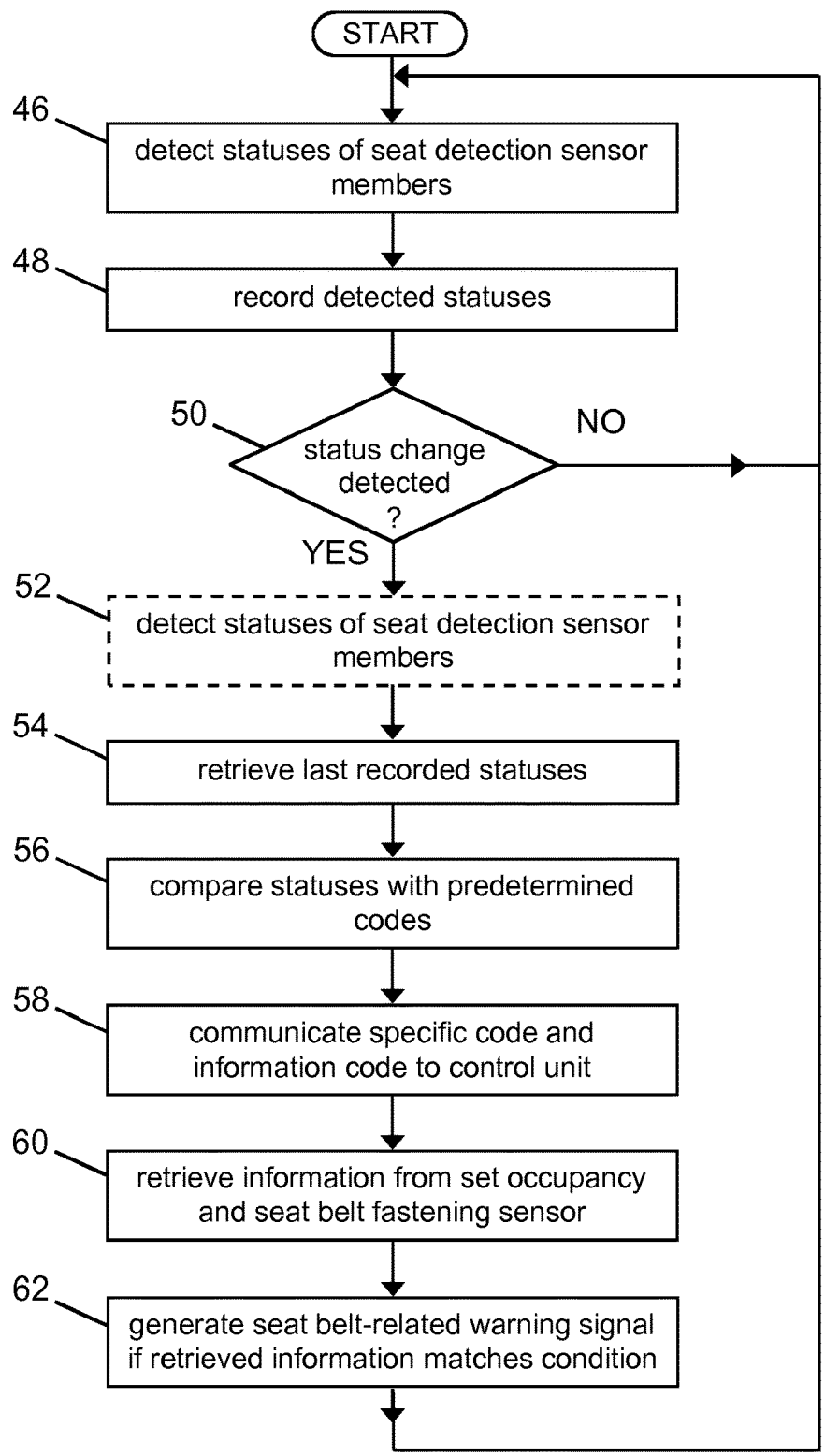
FIG. 4 is a flow chart of a method in accordance with an embodiment of the invention for providing seat belt reminder function, using the seat belt reminder system pursuant to FIG. 2.

In the following, an embodiment of a method for providing seat belt reminder function, using the seat belt reminder system 10 pursuant to FIG. 2, will be described. A flowchart of the method is provided in FIG. 4. In preparation of using the seat belt reminder system 10, it shall be understood that all involved systems, units and devices are in an operational state and configured as illustrated in FIGS. 1 and 2.

As a first step 46 of the method, for each removable vehicle seat 30 the status of each one of the first seat detection sensor members 24 is periodically detected, for example at a rate of 5 min$^{-1}$, by the decoder unit 22. After each conducted step 46 of detecting, the statuses are recorded in a digital data memory unit of the decoder unit 22 in another step 48. In a further step 50, it is checked if at least one detected sensor member status has changed in comparison to a preceding recorded status.

If so, in another step 52 of the method, for each removable vehicle seat 30, the status of each one of the first seat detection sensor members 24 is detected by the decoder unit 22 of each vehicle seat sensor unit 14. In an alternative step 54, the last recorded statuses may be retrieved from the digital data memory unit of the decoder unit 22. The detected statuses are then arranged as a status pattern by the decoder unit 22 and are compared with a set of predetermined codes that reside in the digital data memory unit of the decoder unit 22 in the next step 56. In a further step 58, in case of a detected status pattern matching a specific code of the set of predetermined codes, the specific code and an information code are communicated to the control unit 16 via the common wireless communication means.

It is worth noting that in an alternative embodiment, in which the second seat detection sensor members 26 are designed as electromagnets, switching one of the electromagnets on or off will initiate the previously described step 52 of detecting the status of each one of the first seat detection sensor members 24 to be carried out.

An example of the set of predetermined codes may comprise the following status patterns, which are associated to coded information:

(101), (110), (111) vehicle seat 30 correctly mounted at position x
(100) vehicle seat 30 present but not correctly mounted
(000) vehicle seat 30 nearby vehicle or stored within vehicle trunk In the next step 60, for each removable vehicle seat 30 the control unit 16 retrieves a contents of a communication with the seat occupancy sensor 18 of the respective vehicle seat 30 and a signal provided by the seat belt fastening detector 20 of the respective vehicle seat 30.

In a further step 62, the control unit 16 generates a seat belt fastening-related warning signal if a combination of the communication contents of the seat occupancy sensor 18, the signal provided by the seat belt fastening detector 20 and the communicated code representing a status of the seat detection sensor members 24 of the respective removable vehicle seat 30 matches at least one predetermined condition.

One example for one of the predetermined conditions may be (VEHICLE SEAT CORRECTLY MOUNTED=TRUE) AND (SEAT OCCUPIED=TRUE) AND (SEAT BELT FASTENED=FALSE), by which positive false warnings can be prevented in a situation in which a removable vehicle seat 30 has been removed and is being stored in a trunk of the vehicle, and a luggage piece that is heavy enough to trigger the seat occupancy sensor 18 is put on the vehicle seat 30.

Another example for one of the predetermined conditions may be (VEHICLE SEAT CORRECTLY MOUNTED=FALSE) AND (SEAT OCCUPIED=TRUE) AND (SEAT BELT FASTENED=(TRUE OR FALSE)), by which a warning is given out to inform a seat occupant about the vehicle seat 30 not being correctly mounted.

While one or more embodiments of the invention have been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

The invention claimed is:

1. A vehicle seat sensor unit, comprising at least one seat occupancy sensor arrangeable at a surface of a vehicle seat, the seat occupancy sensor being configured for wirelessly communicating with a control unit to be mounted in a vehicle, characterized by
at least one first seat detection sensor member and at least one second seat detection sensor member, wherein
the at least one first seat detection sensor member is arrangeable in one out of a lower vehicle seat portion and a vehicle cabin floor, and the at least one second seat detection sensor member is attachable to the other one out of the lower vehicle seat portion and the vehicle cabin floor to which the vehicle seat is fixedly mountable in a removable manner,
the at least one first seat detection sensor member and the at least one second seat detection sensor member are configured to physically interact if mutually arranged within a specific distance, and
the physical interaction results in a detectable change of a status of at least one out of the at least one first seat detection sensor member and the at least one second seat detection sensor member.

2. The vehicle seat sensor unit as claimed in claim 1, comprising
a number of at least n first seat detection sensor members, with n being a natural number larger than one, wherein the at least n first seat detection sensor members are arrangeable in one out of the lower vehicle seat portion and the vehicle cabin floor at mutually different mounting locations, and
a number of m second seat detection sensor members, with m being a natural number larger than one and equal to or smaller than n, wherein the m second seat detection sensor members are attachable to the other one out of the lower vehicle seat portion and the vehicle cabin floor at mutually different mounting locations, such that at least two of the m second seat detection sensor members are arrangeable within the specific distance to two different first seat detection sensor members of the at least n first seat detection sensor members.

3. The vehicle seat sensor unit as claimed in claim 2, wherein the m second seat detection sensor members are attachable to the other one out of the lower vehicle seat portion and the vehicle cabin floor at mutually different mounting locations, such that each one of the m second detection sensor members is arrangeable within the specific distance to a different one of the at least n first seat detection sensor members.

4. The vehicle seat sensor unit as claimed in claim 1, wherein the physical interaction is of at least one out of magnetic, electromagnetic and optical nature.

5. The vehicle seat sensor unit as claimed in claim 1, wherein the at least one first seat detection sensor member or at least one of the n first seat detection sensor members comprises at least one reed switch, and the at least one of the second seat detection sensor member or at least one of the second seat detection sensor members is configured to generate a magnetic field at least within a distance equal to the specific distance.

6. The vehicle seat sensor unit as claimed in claim 1, further including a decoder unit for detecting and evaluating the detectable changes of statuses of the first seat detection sensor members and the second seat detection sensor members.

7. A vehicle seat that is mountable in a vehicle in a removable manner, including a vehicle seat sensor unit as claimed in claim 6, wherein
the seat occupancy sensor is arranged at a surface of the vehicle seat,
either the first or the second seat detection sensor member is or either the first or the second seat detection sensor members are arranged in the vehicle seat,
the decoder unit is arranged in the vehicle seat, and
the seat belt fastening detector is installed in the vehicle seat.

8. The vehicle seat sensor unit as claimed in claim 1, further including a seat belt fastening detector that is configured for detecting a seat belt usage condition and for generating a signal indicative thereof, the seat belt fastening detector being configured for providing the signal to the control unit.

9. The vehicle seat sensor unit as claimed in claim 1, wherein either the first or the second seat detection sensor member is or either the first or the second seat detection sensor members are arrangeable in the vehicle seat, and the other one out of the first and second seat detection sensor member is or the other one out of the first and second seat detection sensor members are fixedly attachable at the vehicle cabin floor.

10. A vehicle seat sensor system, comprising a number of k vehicle seat sensor units as claimed in claim 1, wherein k is a natural number and is equal to or smaller than $2^{(n-1)}-1$, with n being a natural number larger than one, wherein
the seat occupancy sensor,
if applicable the seat belt fastening detector, and
either the at least n first seat detection sensor members or the m second seat detection sensor members
of each one of the k vehicle seat sensor units are arrangeable at a different vehicle seat of a vehicle.

11. A seat belt reminder system, including a vehicle seat sensor system as claimed in claim 10 and a control unit configured for wireless communication with the seat occupancy sensors, the seat belt fastening detectors and the decoder units.

12. A method for providing seat belt reminder function for vehicle seats that are mountable in a vehicle in a removable manner, using the seat belt reminder system as claimed in claim 11 comprising the vehicle seat sensor unit having a decoder unit for detecting and evaluating the detectable changes of statuses of the first seat detection sensor members and the second seat detection sensor members, the method comprising steps of for each vehicle seat, detecting the status of each one of the first seat detection sensor members or the second seat detection sensor members, for each vehicle seat, comparing the detected status with a set of predetermined codes, in case of the detected status matching a specific code of the set of predetermined codes, communicating at least the specific code to the control unit.

13. The method as claimed in claim 12, further comprising steps of repetitively detecting, for each vehicle seat, the status of each one of the first seat detection sensor members or the second seat detection sensor members, recording the detected statuses, checking if at least one detected sensor member status has changed in comparison to a preceding recorded status of the sensor member, conducting at least the following steps, if at least one changed sensor member status has been detected, for each vehicle seat, comparing the detected status with a set of predetermined codes, and in case of the detected status matching a specific code of the set of predetermined codes, communicating at least the specific code to the control unit.

14. The method as claimed in claim 12, further comprising steps of for each vehicle seat, retrieving a contents of a communication with the seat occupancy sensor of a specific vehicle seat and a signal provided by the seat belt fastening detector of the specific vehicle seat, for each vehicle seat, generating a warning signal related to seat belt fastening, based on a combination of the contents of the communication with the seat occupancy sensor of the specific vehicle seat, the signal provided by the seat belt fastening detector of the specific vehicle seat, and the communicated code representing a status of the seat detection sensor members arranged at the specific vehicle seat matching at least one predetermined condition.

* * * * *